US011434001B2

(12) United States Patent
Godin

(10) Patent No.: US 11,434,001 B2
(45) Date of Patent: Sep. 6, 2022

(54) SYSTEMS AND METHODS FOR TRANSPORTING A FLUID USING AN UNMANNED AERIAL VEHICLE

(71) Applicant: Kevin Godin, Woodbridge, VA (US)

(72) Inventor: Kevin Godin, Woodbridge, VA (US)

(*) Notice: Subject to any disclaimer, the term of this patent is extended or adjusted under 35 U.S.C. 154(b) by 0 days.

(21) Appl. No.: 17/574,009

(22) Filed: Jan. 12, 2022

(65) Prior Publication Data

US 2022/0219819 A1    Jul. 14, 2022

Related U.S. Application Data

(60) Provisional application No. 63/136,726, filed on Jan. 13, 2021.

(51) Int. Cl.
| | | |
|---|---|---|
| *B64C 39/02* | (2006.01) | |
| *A62C 37/00* | (2006.01) | |
| *A62C 37/10* | (2006.01) | |
| *A62C 37/21* | (2006.01) | |
| *A62C 37/36* | (2006.01) | |
| *A62C 3/02* | (2006.01) | |

(52) U.S. Cl.
CPC ............ *B64C 39/02* (2013.01); *A62C 3/0235* (2013.01); *A62C 37/04* (2013.01); *A62C 37/10* (2013.01); *A62C 37/21* (2013.01); *B64C 2201/027* (2013.01); *B64C 2201/042* (2013.01); *B64C 2201/088* (2013.01); *B64C 2201/128* (2013.01); *B64C 2201/146* (2013.01)

(58) Field of Classification Search
CPC ............ B64C 39/02; B64C 2201/027; B64C 2201/042; B64C 2201/088; B64C 2201/128; B64C 2201/146; B64C 39/024; A62C 3/0235; A62C 37/04; A62C 37/10; A62C 37/21; C02F 1/00; C02F 1/265; C02F 1/4604; C02F 1/469; C02F 1/4676; C02F 2103/08

See application file for complete search history.

(56) References Cited

U.S. PATENT DOCUMENTS 4,118,299 A * 10/1978 Maget .................. C02F 1/4604
                                                                     204/520
10,145,015 B2 * 12/2018 Carey ....................... C01B 5/00
(Continued)

FOREIGN PATENT DOCUMENTS

| CN | 207565841 U | 7/2018 |
| CN | 112191572 A | 1/2021 |
| WO | 2017080029 A1 | 5/2017 |

OTHER PUBLICATIONS

International Search Report and Written Opinion issued by the European Patent Office in connection with International Application No. PCT/US2022/012107, dated Mar. 29, 2022.

*Primary Examiner* — Yonel Beaulieu
(74) *Attorney, Agent, or Firm* — Carter, DeLuca & Farrell LLP; George Likourezos

(57) ABSTRACT

An unmanned aerial vehicle ("UAV") system for fluid transport includes a UAV having a fluid chamber configured to transport a fluid, a processor, and a memory. The memory includes instructions which, when executed by the processor, may cause the system to receive a first location for collecting or releasing a fluid, determine a fluid level of the fluid chamber, and transport the fluid by the UAV to the first location based on the determined fluid level.

20 Claims, 5 Drawing Sheets

(56) References Cited

U.S. PATENT DOCUMENTS

| | | | |
|---|---|---|---|
| 10,538,435 B2 | 1/2020 | Frolov et al. | |
| 10,875,793 B2 | 12/2020 | Parkey et al. | |
| D928,072 S * | 8/2021 | Liang | D12/328 |
| 11,214,486 B2 * | 1/2022 | Carey | C25B 11/075 |
| 11,286,058 B2 * | 3/2022 | Holvey | B64F 1/007 |
| 2010/0101955 A1 * | 4/2010 | Nocera | C25B 1/04 |
| | | | 204/547 |
| 2011/0036919 A1 * | 2/2011 | Baird | G06Q 99/00 |
| | | | 239/2.1 |
| 2012/0292197 A1 * | 11/2012 | Albrecht | B01J 27/122 |
| | | | 204/242 |
| 2013/0206606 A1 * | 8/2013 | Gilliam | C25B 15/08 |
| | | | 204/242 |
| 2016/0144734 A1 * | 5/2016 | Wang | B64C 39/024 |
| | | | 701/17 |
| 2016/0290223 A1 * | 10/2016 | Mills | G21B 3/00 |
| 2018/0319477 A1 | 11/2018 | Yakub | |
| 2020/0317318 A1 * | 10/2020 | Wu | B64D 1/16 |
| 2020/0335806 A1 | 10/2020 | Zheng et al. | |
| 2021/0339858 A1 * | 11/2021 | Ermanoski | B64C 29/0025 |
| 2022/0064030 A1 * | 3/2022 | Suss | C02F 1/4693 |

* cited by examiner

SYSTEMS AND METHODS FOR TRANSPORTING A FLUID USING AN UNMANNED AERIAL VEHICLE

CROSS-REFERENCE TO RELATED APPLICATIONS

The present application claims the benefit of and priority to U.S. Provisional Patent Application Ser. No. 63/136,726, filed on Jan. 13, 2021, the entire contents of which are hereby incorporated by reference.

TECHNICAL FIELD

The present disclosure relates to systems and methods for fluid transport and distribution. More specifically, the present disclosure relates to a system having an unmanned aerial vehicle for transporting water.

SUMMARY

Aspects of the present disclosure are described in detail with reference to the drawings wherein like reference numerals identify similar or identical elements.

The disclosure relates to devices, systems, and methods associated with an unmanned aerial vehicle ("UAV") system for fluid transportation. The system includes a UAV having a fluid chamber for transporting a fluid, a processor, and a memory. The memory stores instructions which, when executed by the processor, cause the system to receive a first location for collecting a fluid, determine a fluid level within the fluid chamber, and transport the fluid by the UAV to the first location.

In accordance with aspects of the disclosure, the instructions, when executed by the processor, may further cause the system to determine if the UAV is charged to a pre-determined energy level (e.g., voltage level) sufficient to fly to the first location and deliver the fluid to the first location.

In an aspect of the present disclosure, the system may further include a photovoltaic ("PV") panel configured to collect solar energy, a desalinator, and/or a hydro cell configured to generate electricity and store energy. The UAV system includes instructions which, when executed by the processor, may further cause the system to receive a voltage from the PV panel for charging the hydro cell, determine if the hydro cell has reached a pre-determined level of charge, and move and/or fly the UAV based on the determination.

In another aspect of the present disclosure, the UAV system includes instructions which, when executed by the processor, may further cause the system to pass the fluid through an electrolyzer, obtain hydrogen and oxygen from the fluid, and store the hydrogen in a hydrogen tank.

In yet another aspect of the present disclosure, the UAV system may further include instructions which, when executed by the processor, may further cause the system to determine if the UAV is located above the first location for fluid release, and open a valve based on the determination.

In a further aspect of the present disclosure, the fluid may include desalinated water and/or salt-water. The valve may be coupled to the fluid chamber.

In yet a further aspect of the present disclosure, the UAV system includes instructions which, when executed by the processor, may further cause the system to determine if there is any fluid left in the fluid chamber, and based on the determination, fly the UAV to a fluid collection location or to a second location for fluid delivery.

In an aspect of the present disclosure, the valve may be operably connected to a pump.

In another aspect of the present disclosure, a method for fluid transport associated with the UAV system of the present disclosure includes receiving a first location to which a fluid is to be delivered by a UAV, determining a fluid level of the fluid within a chamber of the UAV, and transporting the fluid by the UAV to the first location for delivery of the fluid.

In yet another aspect of the present disclosure, the method may further include collecting solar energy to generate electricity to generate a first energy, collecting salt-water, desalinating the salt-water to generate a second energy, and charging a battery on the UAV to a pre-determined level of energy using at least one of the first energy or the second energy.

In aspects, the method may further include receiving a voltage from a PV panel to power a desalinator, passing the fluid through a desalinator, conducting electrolysis on the desalinated fluid to generate hydrogen, and storing the hydrogen in a hydrogen tank in fluid communication with the hydro cell.

In an aspect of the present disclosure, the method may further include determining if the UAV is charged to a pre-determined energy level sufficient to fly to the first location and delivering the fluid to or remove the fluid from the first location based on the determination.

In another aspect of the present disclosure, the method may further include receiving a voltage from the PV panel for charging the hydro cell, determining if the hydro cell has reached a pre-determined level of charge, and initiating flight of the UAV if the pre-determined level of charge is reached.

In yet another aspect of the present disclosure, the method may further include receiving the fluid within at least one of the hydro cell or the desalinator from the fluid chamber, obtaining hydrogen and oxygen gases from the fluid, and storing the hydrogen in a hydrogen tank.

In a further aspect of the present disclosure, the method may further include determining if the UAV is located above the first location for fluid release, and opening a valve based on the determination.

In an aspect of the present disclosure, the fluid may be desalinated water or salt water, and the valve is coupled to the fluid chamber.

In yet a further aspect of the present disclosure, the method may further include determining if there is any fluid left in the fluid chamber and based on the determination, flying the UAV to the first location for fluid collection or a second location for fluid delivery.

In accordance with aspects of the disclosure, a non-transitory computer-readable storage medium storing a program for causing a controller to execute a method for fluid transport is presented. The method includes receiving a first location for collecting a fluid, by an unmanned aerial vehicle ("UAV") including a fluid chamber configured to transport the fluid, determining a fluid level of the fluid in the fluid chamber relative to a pre-determined fluid level for the fluid, and transporting the fluid by the UAV to a second location based on the determined fluid level.

Further details and exemplary aspects of the present disclosure are described in more detail below with reference to the figures. Any of the aspects of the present disclosure may be combined with other aspects without departing from the scope of the present disclosure.

BRIEF DESCRIPTION OF THE DRAWINGS

A better understanding of the features and advantages of the disclosed technology will be obtained by reference to the following detailed description that sets forth illustrative aspects, in which the principles of the technology are utilized, and the accompanying drawings of which.

DETAILED DESCRIPTION

Figure 1:
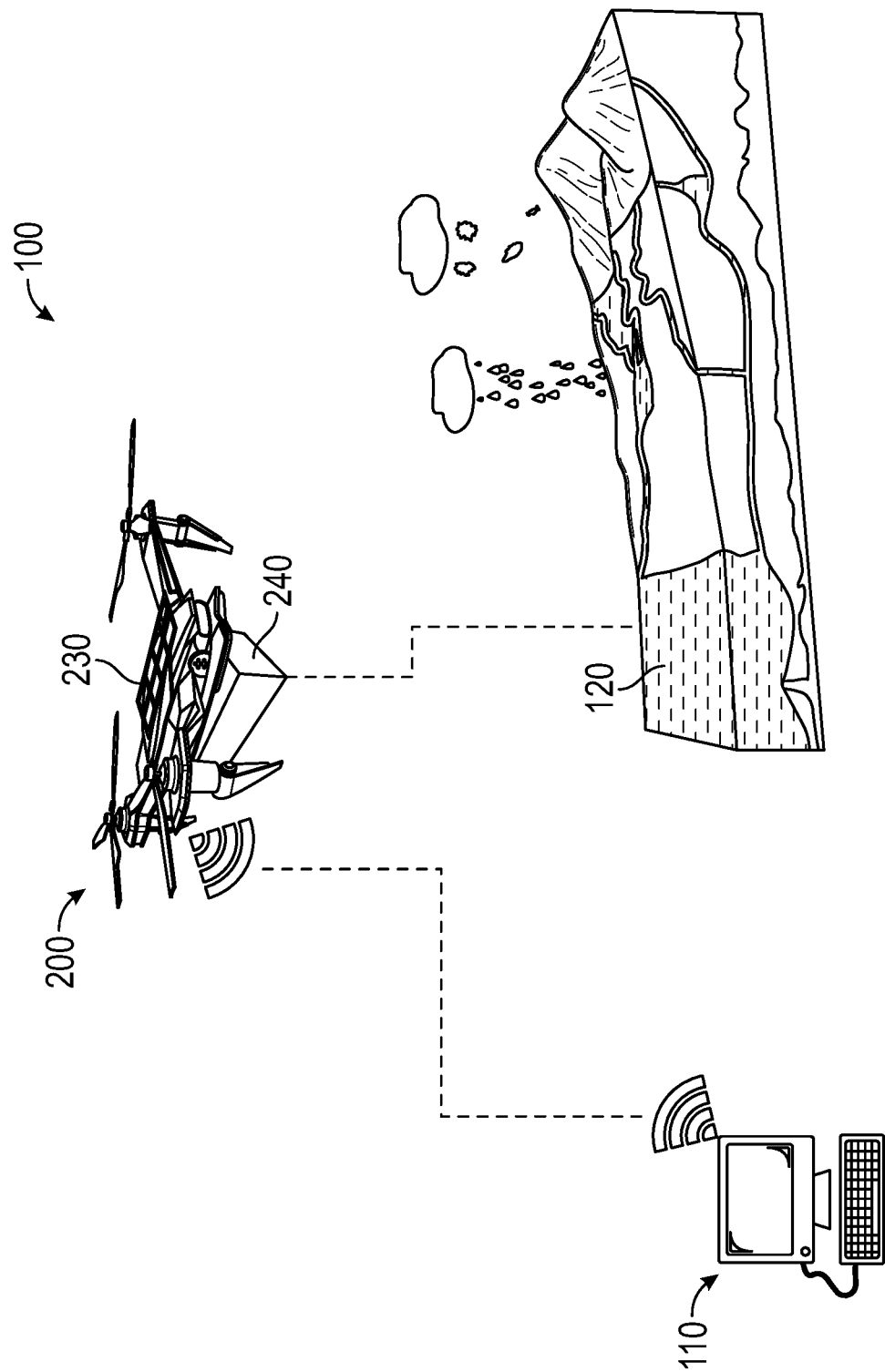
FIG. 1 is a diagram illustrating a system for transporting a fluid in accordance with the present disclosure.

The present disclosure relates to system and methods for transporting a fluid using an unmanned aerial vehicle ("UAV").

Although the present disclosure will be described in terms of specific aspects, the present disclosure will be readily apparent to those skilled in this art that various modifications, rearrangements, and substitutions may be made without departing from the spirit of the present disclosure. The scope of the present disclosure is defined by the claims appended hereto. For example, the present disclosure will be described encompassing one UAV, however, is contemplated that the system may include multiple UAV's or even an unmanned land vehicle. Using manned aircraft or vehicles is also contemplated in accordance with the present disclosure, such as, for example, manned vertical takeoff and landing ("VTOL") aircraft or vehicles.

For purposes of promoting an understanding of the principles of the present disclosure, reference will now be made to exemplary aspects illustrated in the drawings, and specific language will be used to describe the same. The present disclosure will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

Generally, unmanned systems having an unmanned vehicle (typically having a robot, controllers, station, or base, etc.) may be limited by the battery capacity and/or the location of the charging station associated with the unmanned vehicle. Most unmanned vehicles lack compartments to store fluids and means to generate energy. As the unmanned vehicle moves (e.g., flies), the battery discharges or the source of power may reduce the amount of outputted power, and at a certain point, the unmanned vehicle must recharge (e.g., a UAV lands for recharging).

The present disclosure provides a novel system and method for powering an unmanned vehicle and ultimately transporting a fluid. The system and method generally involve collecting, processing, and transporting a fluid, which may be used in scenarios such as irrigation, fires, and/or other scenarios where using an unmanned vehicle without the need of a charging station may be contemplated. The systems and methods provided in the present disclosure can be used to collect and process a fluid, for example, to desalinate and collect a fluid such as water (e.g., seawater). The fluid, before or after a selected process (e.g., desalination) may be used for power generation (e.g., generate energy to power the unmanned vehicle) and/or irrigation of a selected area. For example, the system may include an unmanned vehicle which may be configured to fly and irrigate a vegetable plantation in a controlled manner (e.g., a controlled drop), and/or configured to drop water above a house or a forest fire. It is contemplated that the system may provide pre-emptive irrigation and/or irrigation in a responsive capacity.

In aspects, elements that may be associated with the functional enablement of elements to the UAV, desalinator, hydro cell, and the PV panel may not be described in detail (e.g., screws, wires, circuitry, connectors, etc.). However, some examples may be noted. The desalinator and/or the hydro cell and/or the PV panel may be described to an extent as to enable the functionality of the described aspects yet may not be described in detail.

Figure 2:
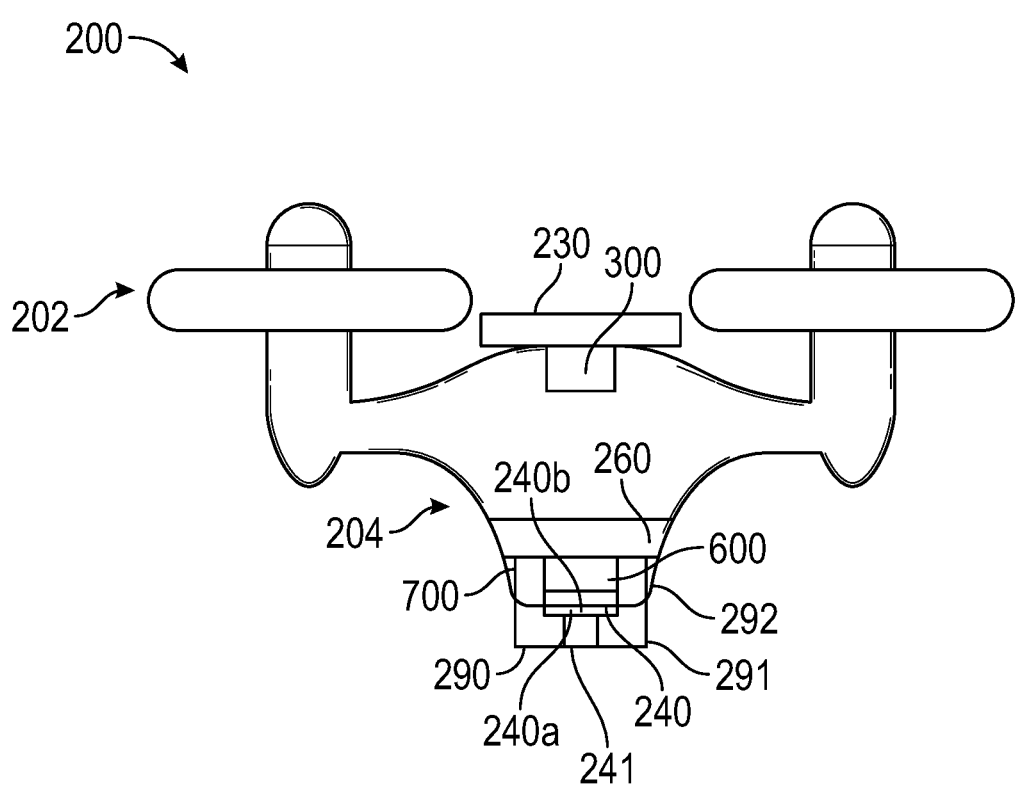
FIG. 2 is a diagram illustrating a UAV in accordance with the present disclosure.

Referring to FIGS. 1 and 2, an exemplary unmanned system UAV system 100 is shown. The UAV system 100 generally includes a UAV 200 (e.g., a helidrone) configured to collect and transport a fluid 120 (e.g., seawater or fresh water). In aspects, the UAV 200 of the present disclosure may be a commercially available flying robot, VTOL or other vehicle. The UAV system 100 may generate electricity (e.g., by solar desalination and/or by a desalination battery), for example, to power and/or charge the UAV 200.

In aspects, the UAV 200 may include a controller 300, a desalinator 600 configured to process the fluid 120, and/or a hydro cell 700.

The desalinator 600 is configured to process seawater or brine to produce a low-salt content water. In aspects, the desalinator 600 may also be part of an energy generation system of the UAV 200. For example, the desalinator 600 may include a solar desalinator, and/or a desalination battery. Solar desalination is a technique to produce water with a low salt concentration from seawater or brine using solar energy. Solar desalination may operate using direct heat from the sun or using electricity generated by solar cells to power a membrane process. For a detailed description of solar desalination, one or more aspects of which may be included, or modified for use with the disclosed aspects, reference may be made to U.S. Pat. No. 10,538,435, the entire contents of which are incorporated herein by reference. A desalination battery is an aqueous energy storage device for the use of seawater deionization. The desalination battery which generally consists of sodium and chloride dual-ion electrochemical electrodes, is an aqueous energy storage device for the use of seawater deionization. The desalination battery uses an electrical energy input (e.g., solar power) to extract sodium and chloride ions from seawater or brine and to generate fresh water. The desalination battery operates in a similar way to capacitive desalination techniques, but instead of storing charge in an electrical double layer (built at the surface of the electrode) it is held in the chemical bonds (bulk of the electrode material).

In aspects, the process for separating seawater into fresh water and brine streams may include immersing in seawater fully charged electrodes, which do not contain mobile sodium or chloride ions when charged. Next, a constant current is applied to the electrodes in the solution order to remove the ions from the solution. Next, the fresh water solution is extracted from the cell and replacing the fresh water solution with additional seawater. Next, the electrodes are recharged in this solution, releasing ions, and creating brine. Finally, the brine solution is replaced with new seawater, and the desalination battery is ready for the next cycle. For a detailed description of a desalination battery, one or more aspects of which may be included, or modified for use with the disclosed aspects, reference may be made to U.S. Pat. No. 10,822,254, the entire contents of which are incorporated herein by reference.

In aspects, the UAV system 100 may further include at least one supplemental battery (not shown) configured to store energy. The supplemental battery may include a lithium-based battery, for example, a lithium polymer battery. The supplemental battery (not shown) may be operably connected to a device that converts other energy forms (e.g., a PV collecting solar energy which can be converted into electricity) into mechanical energy, e.g., a motor (not shown). In further aspects, the supplemental battery (not shown) may be operably connected to the desalinator 600, the hydro cell 700, and/or the UAV 200.

In aspects, the UAV system 100 may be configured for receiving and/or storing location data (e.g., location data in the form of GPS coordinates) in a memory 320 (FIG. 4), and pre-determined fluid characteristics (e.g., salt content of water). In aspects, the UAV system 100 may be configured to interpret mapping software techniques that may aid in identifying and/or interpreting various terrains, flying paths, optimal irrigation patterns, environmental conditions and/or configurations. Thus, the UAV system 100 may include one or more sensors configured to collect environmental conditions, for example, a rain sensor configured to detect rain, and/or a GPS configured to detect features defining a specific area, for example, mountains, windmills, etc., and communicate the results to the controller 300.

Figure 3:
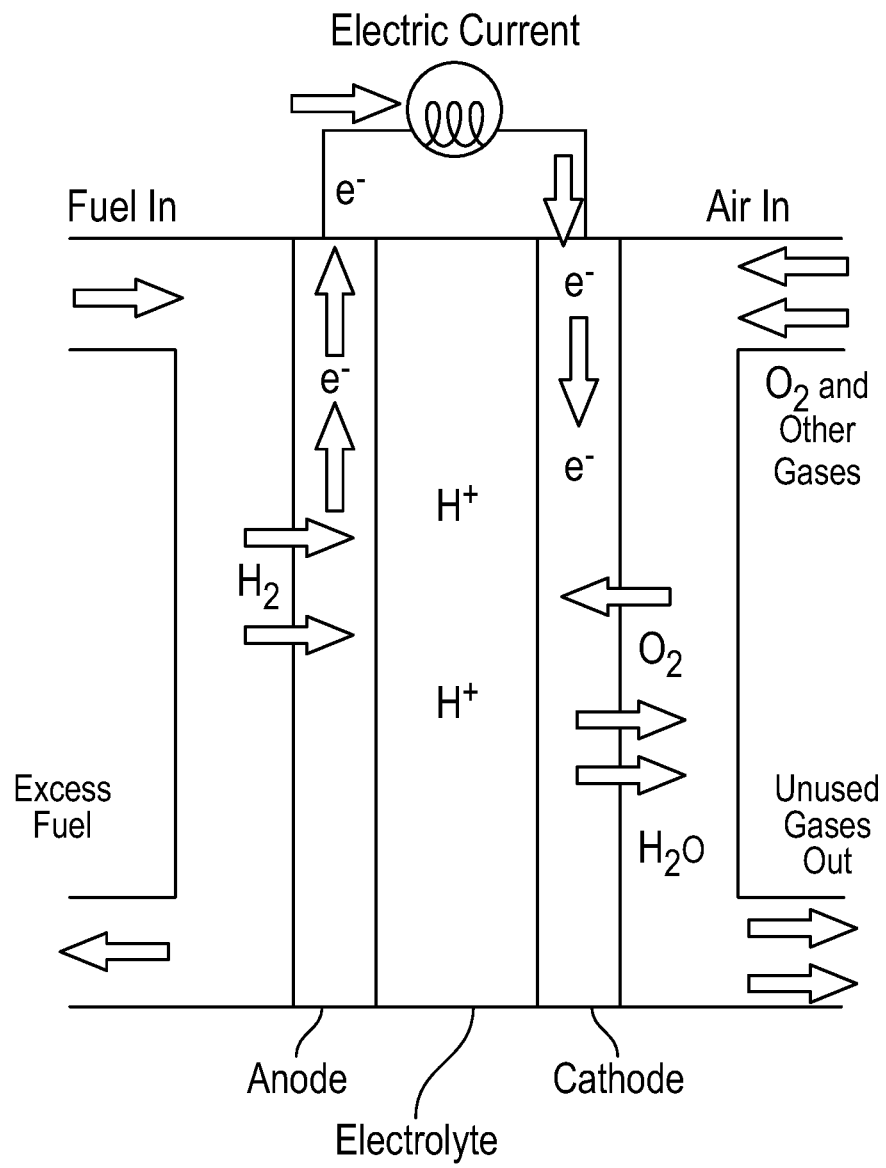
FIG. 3 is a diagram depicting a hydro cell of the UAV system of FIG. 2 in accordance with the present disclosure.

Referring to FIG. 3 a hydro cell 700 is shown. The hydro cell 700 is an electro chemical cell that converts chemical energy of hydrogen to an oxidizing agent (e.g., oxygen). Generally, the hydro cell 700 includes an anode, a cathode, and an electrolyte (e.g., salt-water) that enables ions to move between the two sides of the hydro cell 700. At the anode, a catalyst (e.g., platinum) causes the fuel to undergo oxidation reactions that generate ions (often positively charged hydrogen ions) and electrons. The ions move from the anode to the cathode through the electrolyte (e.g., salt water). At the same time, electrons flow from the anode to the cathode through an external circuit, producing direct current electricity.

With reference to FIGS. 1 and 2, the UAV 200 may include PV panel 230, fluid chamber 240, and hydrogen tank 260. The PV panel 230 may be of any suitable size to generate power for storage and/or use by the UAV systems 100. The fluid chamber 240 is configured to store a fluid 210, such as fresh or desalinated water. The fluid chamber 240 may include two or more sub-chambers 240a, 240b. For example, a first sub-chamber 240a, may be configured to hold fresh water (e.g., desalinated water), while the second sub-chamber may be configured to hold salt-water. The fluid chamber 240 may include an automated release valve configured to enable the release or entry of water to a body of water or release of water to a destination (e.g., a field for irrigation).

In aspects, the UAV system 100 may be configured to conduct an electrolysis process such as separating a fluid into oxygen and hydrogen gases and ultimately transport the fluid(s) to a location (e.g., a first location). For example, the electrolysis process may include a polymer electrolyte membrane (PEM) electrolyzer. Water reacts at the anode to form oxygen and positively charged hydrogen ions (protons). The electrons flow through an external circuit and the hydrogen ions selectively move across the PEM to the cathode. The hydrogen tank 260 may be operably connected to the hydro cell 700 and configured to store hydrogen, which may be generated as a by-product after the fluid 120 is processed at the hydro cell 700. The hydrogen generated from the electrolysis of the fluid 120 may be used to power the UAV 200. The hydrogen tank 260 may be similar in shape and/or configuration to a gas holding tank, e.g., a spherical and/or bulbous design. In aspects the spherical and/or bulbous design may aid the UAV 200 with buoyancy when the tank is resting in water. In aspects, the hydrogen tank 260 may be a container of any kind or shape capable of storing a gas.

In aspects, the UAV 200 may be configured to be stationary at a first location (e.g., waiting for instructions while floating in the ocean, similar to a buoy) prior to, during, or after fluid collection (e.g., the UAV 200 may be configured to wait for a pre-determined event while sitting on the ocean or other body of water). The UAV 200 is configured to collect the fluid 120 and receive the fluid 120 in the fluid chamber 240 (e.g., by a pump 292 of the UAV, or by opening the automated release valve 241). For example, the UAV 200 can be configured to collect fluid such as water from the ocean while waiting for instructions, which may depend on a pre-determined task (e.g., if instructed, travel to a field which requires irrigation and deliver the fresh water). For example, the UAV may sit strategically for an indefinite period of time in a given location waiting for instructions. The UAV may be on stand-by while floating in the ocean, similar to a buoy. For example, the UAV 200 may be configured to deliver water to an agricultural area, to aid agricultural productivity and the local environment/ecosystem.

In aspects, the PV panel 230 may be operably connected to the desalinator 600 to desalinate a fluid. As noted above, the desalinator 600 of the system 100 can be configured to desalinate a fluid having salt (e.g., seawater). The desalinator 600 may utilized solar energy collected via the PV panel 230. In aspects, the UAV 200 may be configured to wait in the ocean while gathering energy from the sun and/or collecting ocean water. In aspects, the PV panel 230 may be connected to an energy storage element (e.g., a battery) from which ultimately energy may be drawn to power the UAV 200. For example, an energy storage element (e.g., a battery) may be configured to power a motor (not shown) configured to drive a selected element of the UAV 200 (e.g., a propeller, rotofan, etc.).

As noted above, the UAV system 100 includes fluid chamber 240. In aspects, after a pre-determined amount of fluid 120 (e.g., seawater) is collected in the fluid chamber 240, the UAV system 100 may enable the UAV 200 to transport the fluid 120 to a desired location (e.g., a house on fire). Thus, the fluid chamber 240 may be configured to host a fluid having salt (e.g., the seawater). In further aspects, the fluid chamber 240 may be operably connected to the hydro cell 700 and/or the desalinator 600 and configured for receiving fresh water from the hydro cell 700 and/or the desalinator 600.

In aspects, the UAV system may pump salt water (via the pump 292 of the UAV system 100) to the hydro cell 700 and/or the desalinator 600. For example, a fluid path (not shown) may be defined between the fluid chamber 240, the desalinator 600, and/or the hydro cell 700. In aspects, the fluid path (not shown) may be a closed-loop path. In further aspects, the fluid chamber 240 can be configured in a way that it can receive a fluid from the environment (e.g., a lake, rainwater, ocean, etc.) prior to and/or post-processing of the fluid. For example, the fluid chamber 240 may be part of a closed-loop fluid path (not shown) in fluid communication with the external environment (e.g., the fluid chamber 240 may be configured to receive water from a lake and water leaving the desalinator 600). In further aspects, the fluid chamber 240 may be configured to collect rainwater.

In aspects, the fluid chamber 240 may be disposed at a selected portion of the UAV 200. For example, the fluid chamber 240 may be connected to lower portion 204 of the UAV 200 in such a way that a user may be able to disconnect the fluid chamber 240 (alternatively, the fluid chamber 240 may be monolithically formed with the UAV 200). The fluid chamber 240 is configured to collect and store a fluid (e.g., seawater) and may include a valve 290 in fluid communication with the fluid chamber 240.

Generally, the valve 290 is configured for selectively passing of the fluid therethrough and into the fluid chamber 240.

In some aspects, the UAV system 100 may include additional valves, e.g., valves to control fluid communication between elements mounted and/or monolithically formed in the UAV 200 (e.g., a valve may be disposed between the desalinator 600 and the fluid chamber 240, when in fluid communication). In aspects, the fluid chamber 240 may be configured to include a selected shape (e.g., a bulbous plastic water container like that of a buoy in shape).

In some aspects, the fluid chamber 240 may act as a buoy for the UAV 200. In some aspects, the fluid chamber 240 and/or the valve 290 may be configured for collecting/releasing a selected fluid based on a selected determination. In another example, the UAV system may be configured to determine if the UAV 200 has arrived at a particular location (e.g., by comparing a GPS location of the UAV to the particular location). In aspects, the UAV system 100 may include a second fluid chamber 291, which can be configured to receive a selected fluid. For example, the second fluid chamber 291 may be configured to receive desalinated water after ocean water has been desalinated via the desalinator 600. In some aspects, the second fluid chamber 291 may be in fluid communication with the fluid path (not shown) noted above.

In aspects, the fluid chamber 240 may be configured to receive a selected fluid after desalination. For example, the fluid chamber 240 may be operably connected to the desalinator 600 in such a way that the system 100 feeds salt-water to the desalinator 600 from the fluid chamber 240. Generally, the desalinator 600 processes the salt-water by substantially removing the salt from the salt-water and ultimately generates energy, e.g., desalinator 600 may be configured as a sodium ion desalination battery, which may include a membrane.

After the salt-water or sea water is processed, the processed salt-water may be removed from the UAV 200 and fed back into the body of salt-water (and/or stored in the second sub-chamber 240b). Further, after the salt-water is processed, the processed water can be feed to the hydro cell 700 from the desalinator 600.

Figure 4:
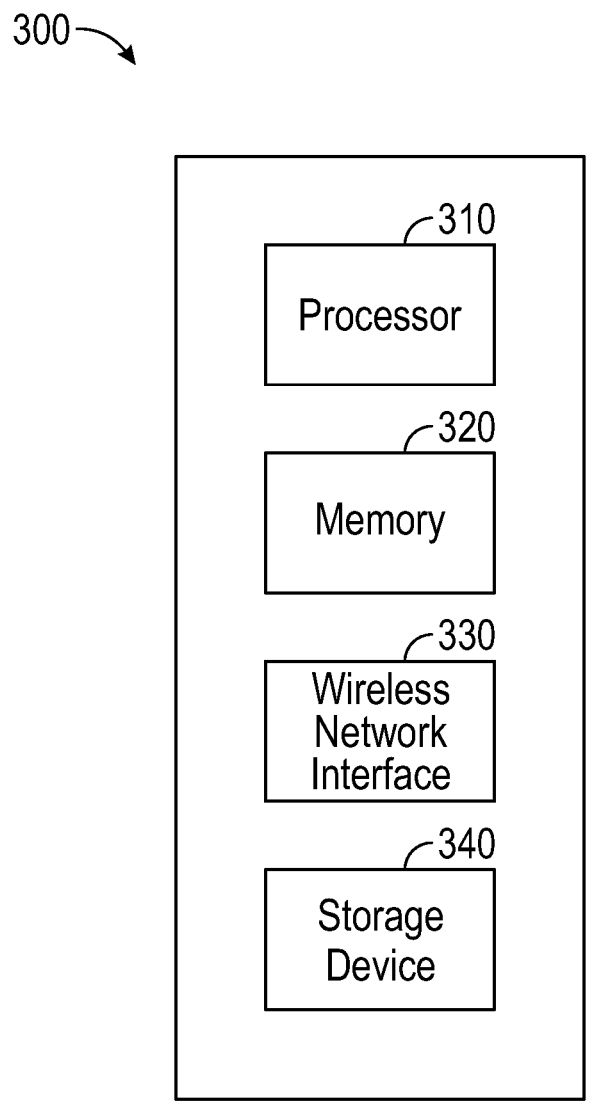
FIG. 4 is block diagram illustrating components of a controller in accordance with the present disclosure.

Turning now to FIG. 4, a block diagram illustrating aspects of an exemplary controller (e.g., controller 300) of UAV system 100 is shown. The controller 300 generally includes a processor 310, memory 320, a wireless network interface 330, and a storage device 340. The memory 320 may include instructions that, when executed by the controller 300, may cause the UAV system 100 to execute the methods disclosed herein.

In various aspects, the memory 320 may include random access memory, read-only memory, magnetic disk memory, solid-state memory, optical disc memory, and/or another type of memory. In various aspects, the memory 320 can be separate from the controller 300 and can communicate with the processor 310 through communication buses of a circuit board and/or through communication cables such as serial ATA cables or other types of cables. The memory 320 includes computer-readable instructions that are executable by the controller 300 to operate the controller 300.

In various aspects, the controller 300 may include a wireless network interface 330 to communicate with other computers or a server (not shown). In aspects, a storage device 340 may be used for storing data. In various aspects, the controller 300 may be, for example, without limitation, a digital signal processor, a microprocessor, an ASIC, a graphics processing unit ("GPU"), field-programmable gate array ("FPGA"), or a central processing unit ("CPU").

Figure 5:
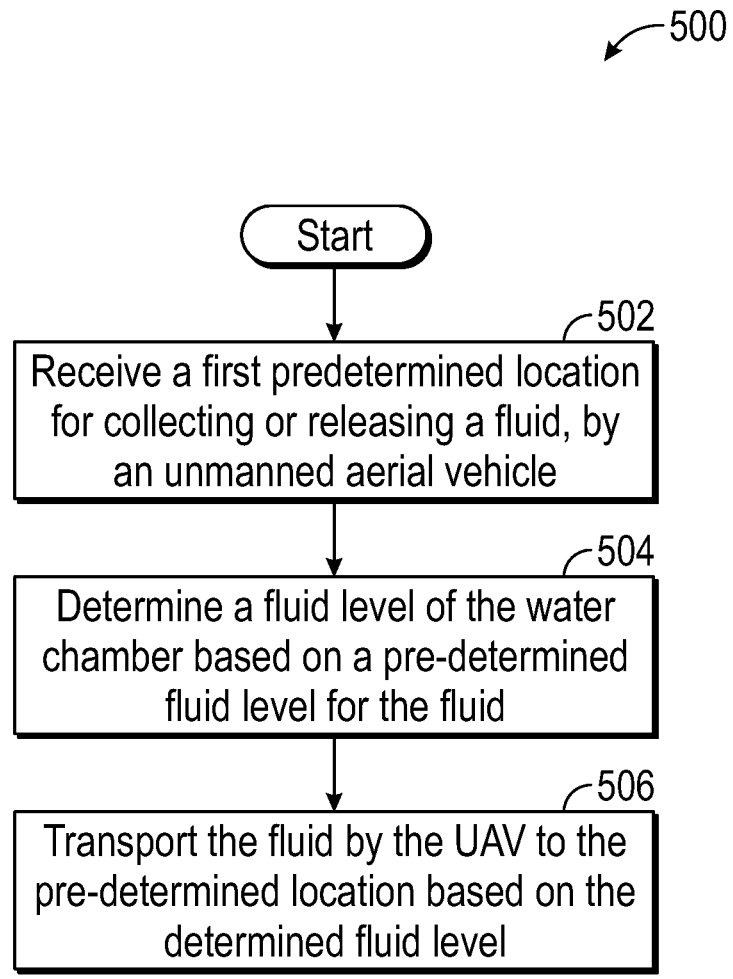
FIG. 5 is a flow diagram for a method for fluid transport in accordance with the present disclosure.

Referring to FIG. 5, a flow diagram for a method for fluid transport is shown as 500. FIG. 5 shows a flow chart of an exemplary computer-implemented method 500 for location-based and fluid transportation in accordance with aspects of the present disclosure.

Although the steps of FIG. 5 are shown in a particular order, the steps need not all be performed in the specified order, and certain steps can be performed in another order. For example, FIG. 5 will be described below with a server (not shown) performing the operations. However, in various aspects, the operations of FIG. 5 may be performed all or in part by the controller 300 of FIG. 4. In aspects, the operations of FIG. 5 may be performed all or in part by another device, for example, a mobile device and/or a client computer system (e.g., device 110 in FIG. 1). These variations are contemplated to be within the scope of the present disclosure.

Initially, at step 502, the UAV 200 receives a first location to collect or release a fluid (e.g., fluid 120), by a UAV 200 (FIG. 2). The UAV 200 may be initially positioned in a body of salt-water (e.g., a bay). The UAV 200 may receive the first location via wireless communications. The first location may include, for example, a field to be irrigated and/or a location where a fire has broken out, and water is needed to put out fire. As another example, the first location may be a flood zone from which fluid is to be collected, removed, and relocated. Alternatively, the UAV 200 can remain in the body of water for a period of time, and be used as a floating desalination plant.

Next, at step 504, the controller 300 determines a fluid level within the fluid chamber 240, optionally comparing the existing fluid level to a stored pre-determined fluid level. For example, the pre-determined level may be any pre-determined threshold that can supply enough water for irrigation use.

Next, at step 506, the UAV travels to the first location. In aspects, the UAV may collect solar energy (e.g., by a PV panel) and/or fluid (e.g., water) to generate electricity to be used by the UAV 200. In aspects, the UAV may desalinate the fluid to generate electricity to power the UAV 200 and charge the UAV 200 to a pre-determined level of energy. The controller 300 may instruct the UAV 200 to deliver the fluid to the first location.

In further aspects, a UAV 200 may receive a first location for collecting or releasing a selected fluid. For example, the controller 300 may determine a fluid level relative to a pre-determined fluid level for the selected fluid and fly to a location (e.g., a second location different from the first location). In aspects, the controller 300 may prepare the hydro cell 700 to produce electricity, determine if the UAV 200 is charged, and/or if the UAV 200 has enough power to fly to the location, prepare the UAV system 100 for fluid release, and deliver the fluid to the location.

In aspects, the controller 300 may receive a first voltage from the PV panel 230 (or a battery which may be connected to the photovoltaic panel 230) to charge, or power, the hydro cell 700 and/or the UAV 200 and/or the desalinator 600.

Further, the controller 300 may determine if the hydro cell 700 has reached a pre-determined level of charge (e.g., if the UVA system 100 has enough power to desalinate salt-water, and/or if the UAV system 100 has enough power (or a selected voltage passing thereof) to produce hydrogen, or if the UAV system 100 has enough energy to fly the UAV 200 from a fluid collection location to a water delivering location).

In some aspects, the controller 300 may feed a fluid to the hydro cell 700, determine if the fluid can be used to generate a current and/or if hydrogen can be separated (or extracted) from the fluid, process the fluid by splitting the fluid into hydrogen and oxygen-based on the determination, and store the hydrogen (e.g., in hydrogen tank 260). In various aspects, the controller 300 may determine collection of a fluid and/or determine salt in a fluid. In aspects, the controller 300 may energize the UAV 200 hydrogen stored in the hydrogen tank 260.

The controller 300 may determine fluid communication between a fluid source (e.g., a lake, the ocean, water chamber 240) and the hydro cell 700. The controller 300 may manipulate the valve 290 based on a fluid communication determination (e.g., open the valve, or leave the valve closed).

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the present disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different aspects in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms, or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Is understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the figures are presented only to demonstrate certain examples of the present disclosure. Other aspects, elements, steps, methods, and techniques that are insubstantially different from those described above and/or in the appended claims are also intended to be within the scope of the present disclosure.

What is claimed is:

1. An unmanned aerial vehicle ("UAV") system for fluid transport, the UAV system comprising:
    a UAV including:
        a fluid chamber configured to transport a fluid;
        a processor; and
        a memory, including instructions, which when executed by the processor, cause the system to:
            receive a first location for at least one of collecting or delivering a fluid;
            determine a fluid level of the fluid chamber; and
            transport the fluid by the UAV to or from the first location based on the determined fluid level.

2. The UAV system of claim 1, wherein the instructions, when executed by the processor, further cause the system to:
    determine if the UAV is charged to a pre-determined energy level sufficient to fly to the first location; and
    deliver the fluid to or remove the fluid from the first location based on the determination.

3. The UAV system of claim 1, further comprising:
    a photovoltaic ("PV") panel configured to collect solar energy; and
    a hydro cell configured to generate electricity and store energy,
    wherein the instructions, when executed by the processor, further cause the system to:
        receive a voltage from the PV panel for charging the hydro cell;
        determine if the hydro cell has reached a pre-determined level of charge; and
        move the UAV if the pre-determined level of charge is reached.

4. The UAV system of claim 3, wherein the fluid is salt water and the UAV system further comprises:
    a desalinator operably connected to the PV panel and configured to desalinate the fluid,
    wherein the instructions, when executed by the processor, further cause the system to:
    receive the fluid within at least one of the hydro cell or the desalinator from the fluid chamber;
    obtain hydrogen and oxygen gases from the fluid; and
    store the hydrogen gas in a hydrogen tank.

5. The UAV system of claim 1, wherein the instructions, when executed by the processor, further cause the system to:
    determine if the UAV is located above the first location for fluid release; and
    open a valve based on the determination.

6. The system of claim 5, wherein the fluid is desalinated water or salt water, and the valve is coupled to the fluid chamber.

7. The system of claim 5, wherein the instructions, when executed by the processor, further cause the system to:
determine if there is any fluid left in the fluid chamber; and
based on the determination, fly the UAV to the first location for fluid collection or a second location for fluid delivery.

8. The system of claim 7, wherein the valve is operably connected to a pump.

9. The UAV system of claim 1, wherein the fluid level of the fluid chamber is determined relative to a pre-determined fluid level for the fluid.

10. A method for fluid transport, the method comprising:
receiving a first location for collecting a fluid, by an unmanned aerial vehicle ("UAV") including a controller and a fluid chamber, the fluid chamber configured to transport the fluid;
determining, by the controller, a fluid level of the fluid in the fluid chamber relative to a pre-determined fluid level for the fluid; and
transporting the fluid by the UAV to a second location based on the determined fluid level.

11. The method of claim 10, further comprising:
collecting solar energy to generate a first energy;
collecting a fluid;
desalinating the fluid to generate a second energy; and
charging the UAV, by at least one of the first energy or the second energy to a pre-determined level of energy.

12. The method of claim 11, further comprising:
receiving a voltage from a photovoltaic ("PV") panel to power a desalinator, wherein the desalinator operably connected to the PV panel and configured to desalinate the fluid;
passing the fluid through a desalinator in fluid communication with a hydro cell, wherein the hydro cell is configured to generate electricity and store energy; and
conducting an electrolysis process at the hydro cell to generate hydrogen.

13. The method of claim 12, further comprising:
storing the generated hydrogen in a hydrogen tank in fluid communication with the hydro cell.

14. The method of claim 11, further comprising:
determining if the UAV is charged to a pre-determined energy level sufficient to fly to the first location; and
delivering the fluid to, or removing the fluid from the first location based on the determination.

15. The method of claim 12, further comprising:
receiving a voltage from the PV panel for charging the hydro cell;
determining if the hydro cell has reached a pre-determined level of charge; and
initiating flight of the UAV if the pre-determined level of charge is reached.

16. The method of claim 12, further comprising:
receiving the fluid within at least one of the hydro cell or the desalinator from the fluid chamber;
obtaining hydrogen and oxygen gases from the fluid; and
storing the hydrogen gas in a hydrogen tank.

17. The method of claim 14, further comprising:
determining if the UAV is located above the first location for fluid release; and
opening a valve based on the determination.

18. The method of claim 17, wherein the fluid is desalinated water or salt water, and the valve is coupled to the fluid chamber.

19. The method of claim 14, further comprising:
determining if there is any fluid left in the fluid chamber; and
based on the determination, flying the UAV to the first location for fluid collection or a second location for fluid delivery.

20. A non-transitory computer-readable storage medium storing a program for causing a controller to execute a method for fluid transport, the method comprising:
receiving a first location for collecting a fluid, by an unmanned aerial vehicle ("UAV") including a controller and a fluid chamber, the fluid chamber configured to transport the fluid;
determining, by the controller, a fluid level of the fluid in the fluid chamber relative to a pre-determined fluid level for the fluid; and
transporting the fluid by the UAV to a second location based on the determined fluid level.

* * * * *